Sept. 15, 1959  N. HOGLUND  2,904,029
APPARATUS FOR FORMING CONTOURS
Filed June 2, 1958  5 Sheets-Sheet 1

INVENTOR
NILS HOGLUND
BY
William A. Zalesak
ATTORNEY

Sept. 15, 1959   N. HOGLUND   2,904,029
APPARATUS FOR FORMING CONTOURS
Filed June 2, 1958   5 Sheets-Sheet 2

INVENTOR
NILS HOGLUND
BY
William A. Zaleak
ATTORNEY

Sept. 15, 1959  N. HOGLUND  2,904,029
APPARATUS FOR FORMING CONTOURS
Filed June 2, 1958  5 Sheets-Sheet 5

INVENTOR
NILS HOGLUND
BY
William A. Zalesak
ATTORNEY

United States Patent Office 2,904,029
Patented Sept. 15, 1959

2,904,029

APPARATUS FOR FORMING CONTOURS

Nils Hoglund, Summit, N.J.

Application June 2, 1958, Serial No. 739,074

10 Claims. (Cl. 125—11)

My invention relates to apparatus for forming contours, more particularly to grinding wheel dressing apparatus.

In some applications the dresser is of such size and shape to provide the capacity needed, that is, to obtain the overall movement and ratios required, the apparatus extends beyond the front edge of the grinding wheel machine interfering with the shielding of the coolant and with the operation in handling the machine.

It is a principal object of my invention to provide a grinding wheel dressing apparatus which has the overall movement, ratios and capacity of prior apparatus but which nevertheless requires less overhang so that the dresser can be placed within the water rim of the grinder thus reducing interference with the grinders of the earlier dressers.

Apparatus made according to my invention includes a base adapted to be mounted on a grinding wheel apparatus. A housing which carries the various cams, followers and tool slide is slidably mounted on the base to move parallel to the axis of the grinding wheel to be dressed. The housing supports a tool slide movable axially of the wheel to be dressed. The tool slide is mounted in an extension of the housing. The main portion of the housing supports the main slide which in turn supports the contour cam and the feed cam. The main slide is operated by a fluid pressure operated cylinder having its piston rod connected to the main slide. Connected between the main slide and the tool slide is a ratio cam slide having a follower contacting the contour cam and supporting a ratio cam. The tool slide has a follower contacting the ratio cam. Between the main slide and an adjustable follower on the base is an intermediate slide supporting a follower in contact with the feed cam on the main slide and a ratio cam in contact with the adjustable follower. All slides are biased to maintain contact between slides and followers by biasing springs.

Other objects of the invention will appear in the following description with reference to the drawings, in which.

Figure 1:
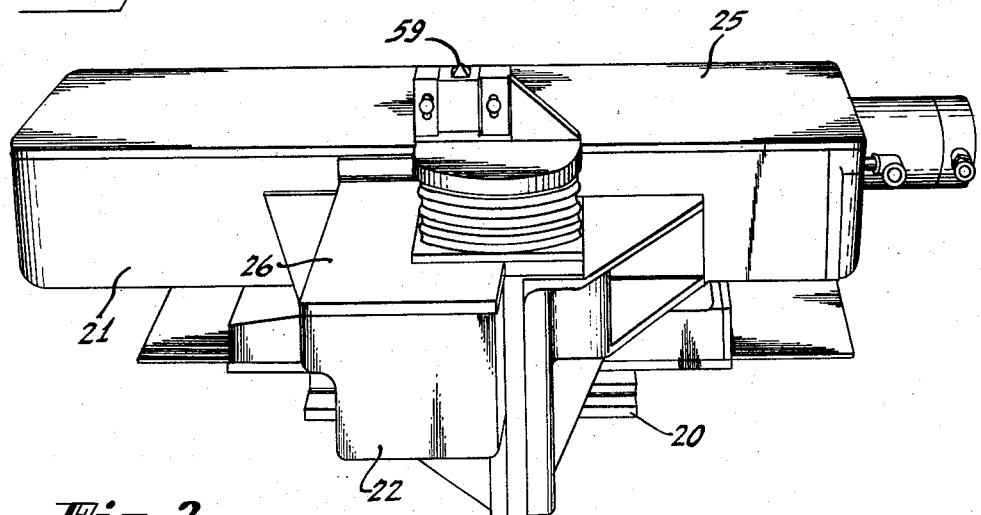
Figure 1 is a front perspective of apparatus made according to my invention showing the tool.
Figure 2:
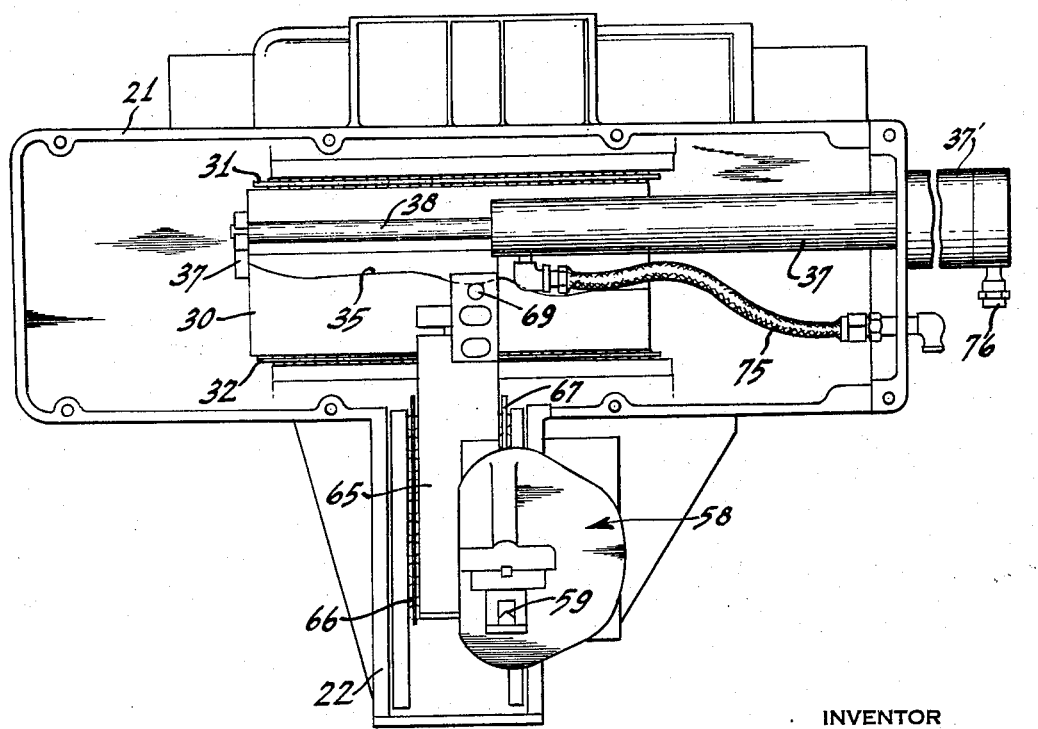
Figure 2 is a plan view with covers removed to show details of construction.
Figure 3:
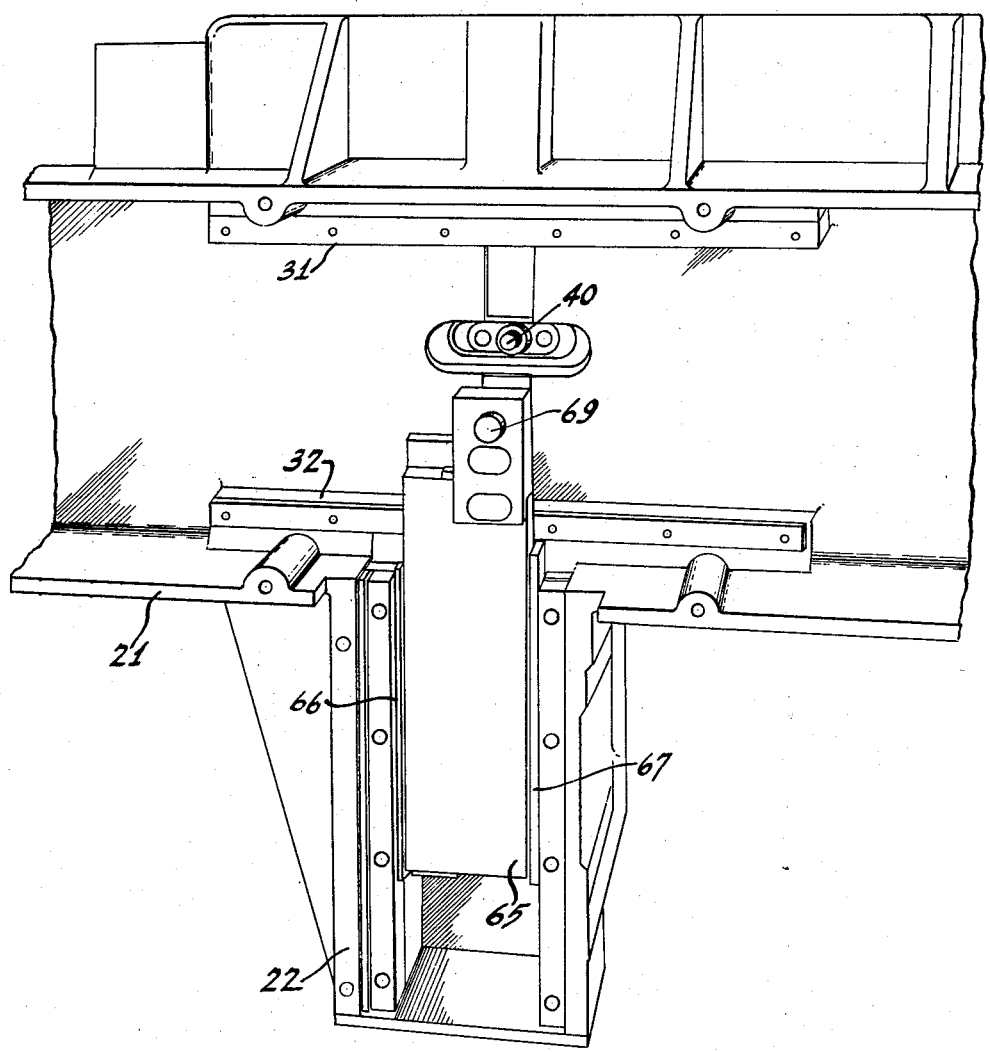
Figure 3 is a perspective with parts removed to show further details of construction.

Referring now to Figures 1, 2, 4 and 6, apparatus made according to my invention includes a base 20 slidably supporting the main housing 21 having the extension 22 thereon which in turn slidably supports the ratio cam slide and tool slide as will be described. The housing 21 is supported on the base 20 by means of ball bearing assemblies 23 and 24. The housing is provided with the covers 25 and 26. The main housing 21 has slidably mounted within it the main cam slide 30 and the intermediate slide 45 for controlling movement of the housing as well as the tool slide.

Referring to Figures 2, 3, 4 and 6, the main slide 30 is slidably supported in the ball bearing assemblies 31 and 32 mounted within the housing 21. On the upper surface of this slide is fixed the contour cam 35 and on the lower surface the feed cam 36. The slide 30 is operated by a hydraulic mechanism including the cylinder 37 supported in sleeve 37' on the housing and the piston rod 38 connected to slide 30 by means of bracket 39. By controlling the flow of fluid under pressure through conduits 75 and 76 to opposite sides of the piston connected to rod 38, the main slide can be made to move back and forth within the housing 21.

To control movement of the housing 21 on base 20 and parallel to the axis of the wheel being dressed, (see grinding wheel 77, Figure 5), I provide, on the base 20, a follower 40 mounted on a slide 41, adjustable by the adjusting screw 42 for fixing the initial position of the follower 40.

Slidably mounted within the housing 21 between the main cam slide 30 and follower 40 is the intermediate slide 45 supported in the bearing assemblies 46 and 47. A follower 48, mounted to extend upwardly from the intermediate slide, is in contact with the feed cam 36 on the main slide 30. A ratio cam 49 on the under surface of the intermediate slide 45 is in contact with the follower 40. Biasing springs 50 attached between the base 20 and housing 21 keep the followers and cams just described in contact so that as the main cam slide 30 moves toward the viewer, the housing 21 moves away from the viewer (Figure 6) or to the right in Figure 4.

Figure 4:
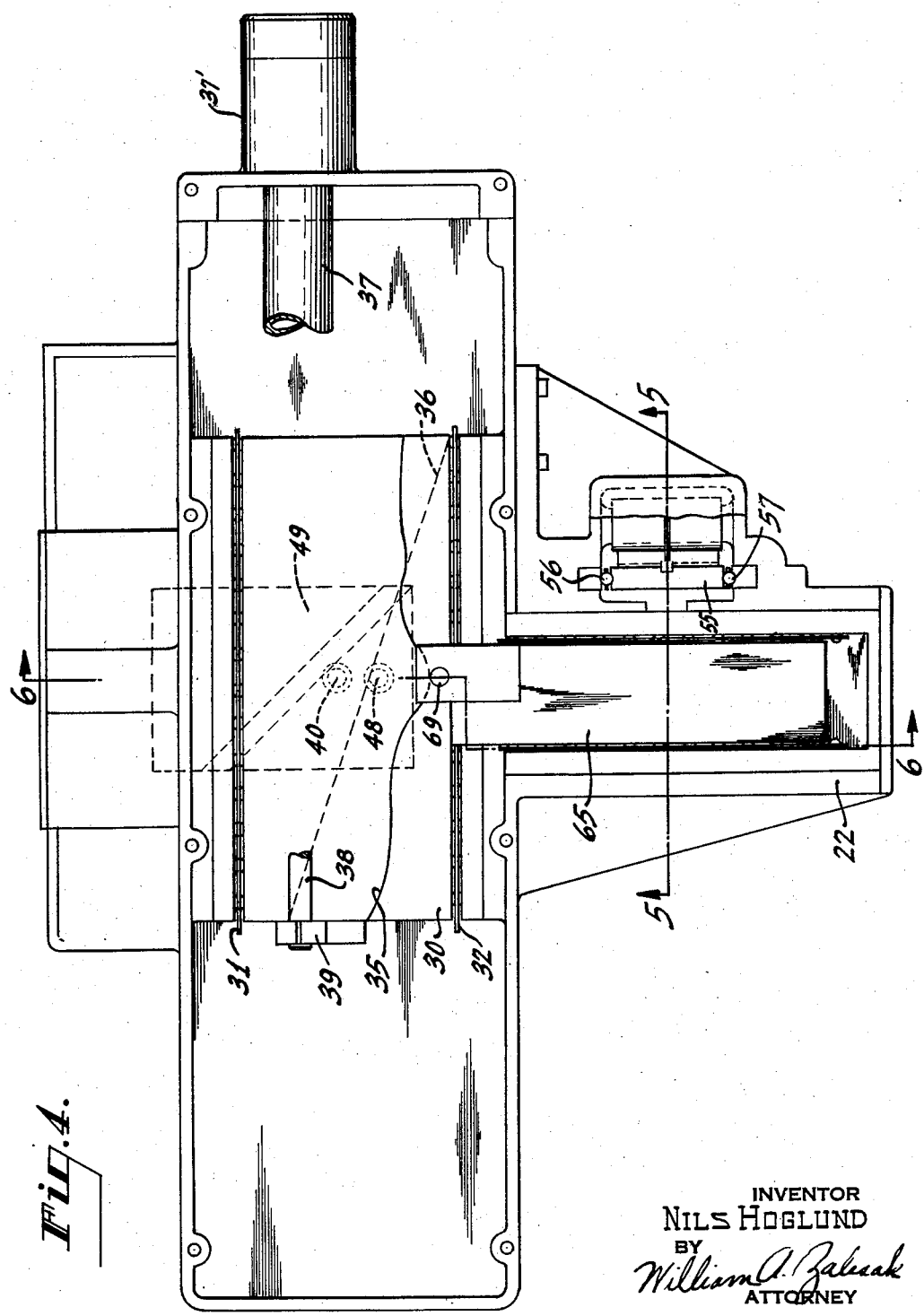
Figure 4 is a plan view with parts removed to show other details of construction.
Figure 5:
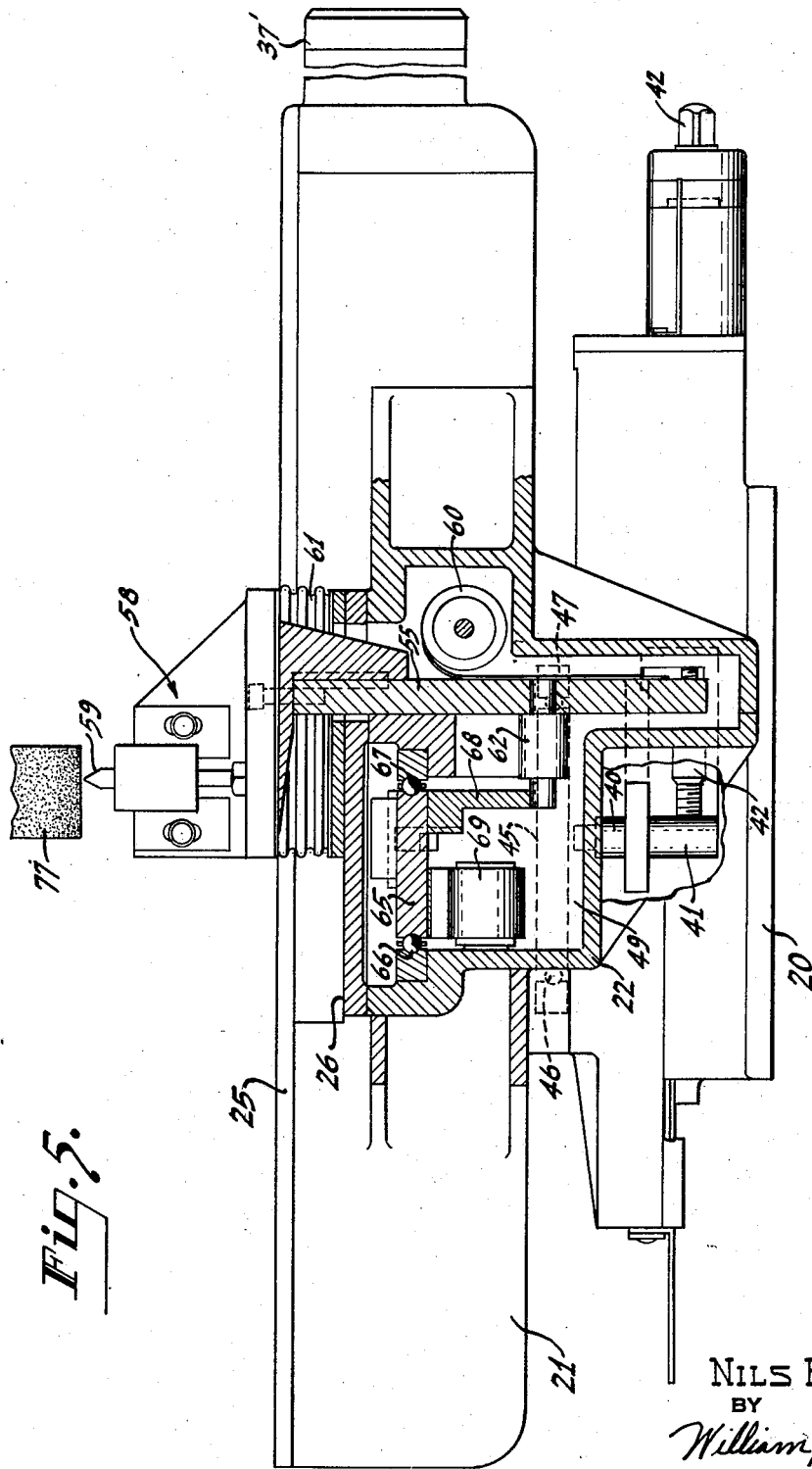
Figure 5 is a vertical section taken along the line 5—5 of Figure 4.
Figure 6:
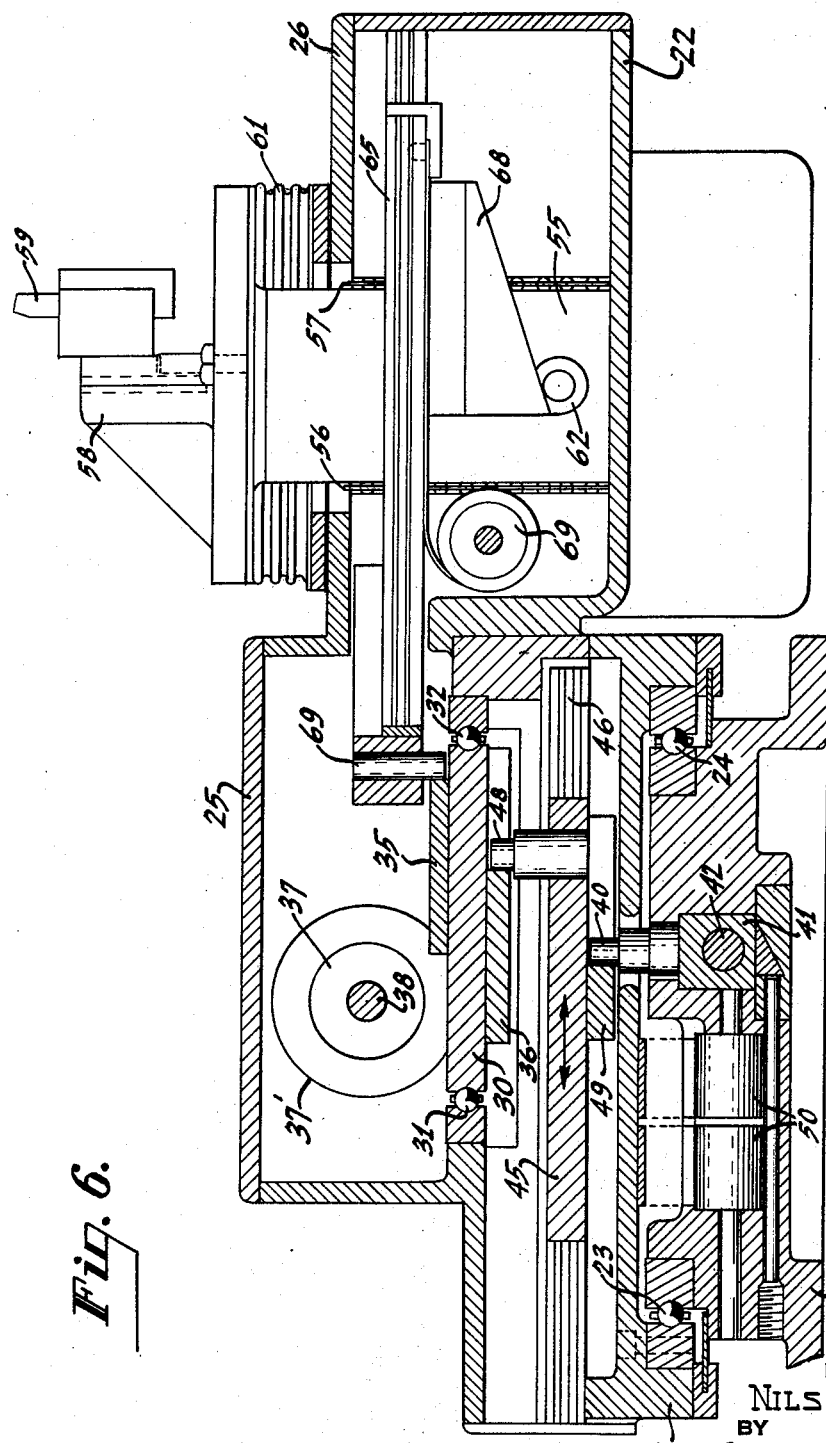
Figure 6 is a vertical section taken along the line 6—6 of Figure 4.

Referring now to Figures 4, 5 and 6, the tool slide and its construction and operation will be described.

The tool slide 55 is slidably mounted for vertical movement in the housing extension 22 by means of the ball bearing assemblies 56 and 57. The tool assembly 58 carrying the cutting diamond 59 is mounted at the upper end of the slide 55. A biasing spring 60 mounted in the housing extension is attached to the slide 55 and urges it upwardly. A dust cover 61 protects the slide. Mounted on the tool slide 55 is the follower 62.

Slidably mounted between the tool slide 55 and the main cam slide 30 is the tool ratio cam slide 65, supported in bearing assemblies 66 and 67. Supported on the underside of slide 65 and in contact with follower 62 is the ratio cam 68. A follower 69 is supported on the other end of slide 65 and is biased into contact with the contour cam 35 by the biasing spring 69 connected between the housing extension 22 and slide 65.

As the main cam slide 30 is moved back and forth, cam 35, follower 69, slide 65, cam 68, follower 62 and slide 55 move the tool 59 radially of the wheel being dressed as the housing moves parallel to the axis of the grinding wheel being dressed.

What is claimed is:

1. Apparatus for forming contours on a grinding wheel including a base, a housing slidably mounted on said base for movement in one direction, a first slide on said housing having a cam on one side and a follower on the other, a follower on said base in contact with said cam, a main slide on said housing and having a cam thereon in contact with the follower on said first slide, said main slide being movable parallel to the movement of said housing, a tool slide on said housing and connections between said tool slide and said main slide for moving said tool slide when said main slide is moved.

2. A grinding wheel dressing apparatus including a base, a housing slidably mounted on said base for movement in one direction, a first slide on said housing slidable transversely of the movement of said housing and having a cam on one side and a follower on the other, a follower on said base in contact with said cam, a main slide on said housing and having a cam therein in contact with the follower on said first slide, said main slide being movable parallel to the movement of said housing, a tool slide on said housing and connections between said tool slide and said main slide for moving said tool slide when said main slide is moved, fluid pressure operated means connected to said main slide for causing movement of said housing and said tool slide and biasing means connected between said base and said housing for maintaining said follower and cam on said first slide in contact.

3. Apparatus for forming contours on a grinding wheel including a base, a housing slidably mounted on said base for movement in one direction, a first slide on said housing slidable transversely of the movement of said housing and having a cam on one side and a follower on the other, an adjustable follower on said base in contact with said cam, a main slide on said housing and having a cam thereon in contact with the follower on said first slide, said main slide being movable parallel to the movement of said housing, a tool slide on said housing and connections between said tool slide and said main slide for moving said tool slide when said main slide is moved.

4. A grinding wheel dressing apparatus including a base, a housing slidably mounted on said base for movement in one direction, a first slide on said housing slidable transversely of the movement of said housing and having a ratio cam on one side and a follower on the other, an adjustable follower on said base in contact with said ratio cam, a main slide on said housing and having a cam thereon in contact with the follower on said first slide, a second cam on said main slide, a second slide on said housing having a follower in contact with said second cam, a tool slide on said housing and connections between said tool slide and said second slide for moving said tool slide when said main slide is moved.

5. Apparatus for forming contours including a base, a housing slidably mounted on said base for movement in one direction, a main slide mounted in said housing and movable parallel to the movement of said housing, means for moving said main slide, a contour cam on one side of said main slide and a feed cam on the other side thereof, an intermediate slide mounted within said housing and having a cam and a follower mounted thereon, an adjustable follower mounted on said base and in contact with the cam on said intermediate slide, the follower on said intermediate slide contacting said feed cam, said main slide and said intermediate slide having transverse movements, a tool slide on said housing and movable transversely of the movement of said main slide, a ratio cam slide connected between said main slide and said tool slide and having a cam and a follower mounted thereon, said last follower contacting the contour cam in said main slide, said tool slide having a follower contacting the cam on said ratio cam slide.

6. Apparatus for forming contours on a grinding wheel including a base, a housing slidably mounted on said base, a main slide mounted in said housing, means for moving said main slide, a contour cam on one side of said main slide and a feed cam on the other side thereof, an intermediate slide mounted within said housing and having a cam and a follower mounted thereon, an adjustable follower mounted on said base and in contact with the cam on said intermediate slide, the follower on said intermediate slide contacting said feed cam, said main slide and said intermediate slide having transverse movements, a tool slide on said housing and movable transversely of the movement of said main and intermediate slides, an auxiliary slide connected between said main slide and said tool slide and having a cam and a follower mounted thereon, said last follower contacting the contour cam in said main slide, said tool slide having a follower contacting the cam on said auxiliary slide.

7. Apparatus for forming contours on grinding wheels including a base, a housing slidably mounted on said base, a main slide mounted in said housing, means for moving said main slide including fluid pressure operated means, a contour cam on one side of said main slide and a feed cam on the other side thereof, an intermediate slide mounted within said housing and having a cam and a follower mounted thereon, an adjustable follower mounted on said base and in contact with the cam on said intermediate slide, the follower on said intermediate slide contacting said feed cam, a tool slide on said housing, a ratio cam slide connected between said main slide and said tool slide and having a cam and a follower mounted thereon, said last follower contacting the contour cam in said main slide, said tool slide having a follower contacting the cam on said ratio cam slide, and biasing means for maintaining the various cams and followers in contact.

8. Apparatus for forming contours on grinding wheels including a base, a housing slidably mounted on said base for movement in one direction, a main cam slide in said housing movable parallel to said one direction, said main slide supporting a contour cam on one side and a feed cam on the other, an extension on said housing, a tool slide mounted in said extension and movable transversely of said one direction and having a follower thereon, an auxiliary slide connected between said main cam slide and said tool slide, a follower on said auxiliary slide in contact with said contour cam, a cam on said auxiliary slide, the follower on said tool slide being in contact with the cam on said auxiliary slide, and means for moving said main cam slide for causing movement of said tool slide when said main cam slide is moved, and connections between said feed cam and said base for causing movement of said housing when said main cam slide is moved.

9. Apparatus for forming contours on grinding wheels including a base, a housing slidably mounted on said base, a main slide mounted in said housing, fluid pressure operated means for moving said main slide, a contour cam on one side of said main slide and a feed cam on the other side thereof, an intermediate slide mounted within said housing and having a cam and a follower mounted thereon, a follower mounted on said base and in contact with the cam on said intermediate slide, the follower on said intermediate slide contacting said feed cam, said main slide and said intermediate slide having parallel movement, an extension on said housing, a tool slide on said extension and movable transversely of the movement of said main and intermediate slides, an auxiliary slide on said extension connected between said main slide and said tool slide and having a cam and a follower mounted thereon, said last follower contacting the contour cam in said main slide, and said tool slide having a follower contacting the cam on said auxiliary slide.

10. Apparatus for forming contours on grinding wheels including a base, a housing slidably mounted on said base, a main slide mounted in said housing, a contour cam on one side of said main slide and a feed cam on the other side thereof, an intermediate slide mounted within said housing and having a cam and a follower mounted thereon, a follower mounted on said base and in contact with the cam on said intermediate slide, the follower on said intermediate slide contacting said feed cam, said main slide and said intermediate slide having parallel movement, an extension on said housing, a tool slide on said extension and movable transversely of the movement of said main and intermediate slides, an auxiliary slide on said extension connected between said main slide and said tool slide and having a cam and a follower mounted thereon, said last follower contacting the contour cam in said main slide, said tool slide having a follower contacting the cam on said auxiliary slide, biasing means connected between said base and said housing, and between said intermediate slide and said housing and said auxiliary slide and said housing for maintaining the various cams and followers in contact.

No references cited.